United States Patent [19]
Bernald

[11] 3,762,452
[45] Oct. 2, 1973

[54] ATTACHMENT FOR A HAND TOOL

[75] Inventor: Ronald Lee Bernald, Sacramento, Calif.

[73] Assignee: Peter Schmall, Fresno, Calif.

[22] Filed: Jan. 7, 1972

[21] Appl. No.: 216,090

[52] U.S. Cl.............. 144/134 D, 90/12, 144/136 C
[51] Int. Cl.............................................. B27c 5/10
[58] Field of Search................ 144/134 D, 134 R, 144/136 C, 136 R, 144 R; 90/12

[56] References Cited
UNITED STATES PATENTS

| | | | |
|---|---|---|---|
| 3,162,221 | 12/1964 | Lacex............................ | 144/134 D |
| 3,312,258 | 4/1967 | Spanpinato.................... | 144/134 D |
| 3,065,654 | 11/1962 | Critelli et al................... | 144/136 C |

*Primary Examiner*—Donald R. Schran
*Attorney*—Herbert A. Huebner et al.

[57] ABSTRACT

An attachment for converting a powered drill into a router, which drill has a chuck adapted to receive a bit providing a router blade and intended for use on a workpiece, and the attachment has a housing with a platform at one end thereof providing a passage extending through the housing; a yoke for adjustably securing the drill on the platform with the chuck extending through the passage; a guide having a sleeve slidably positionable in the passage about the chuck; and a workpiece contact ring coextensive with the guide remote from the sleeve and positionable therewith to control the depth of penetration within the workpiece of the router blade by selective positioning of the guide and attached contact ring.

3 Claims, 4 Drawing Figures

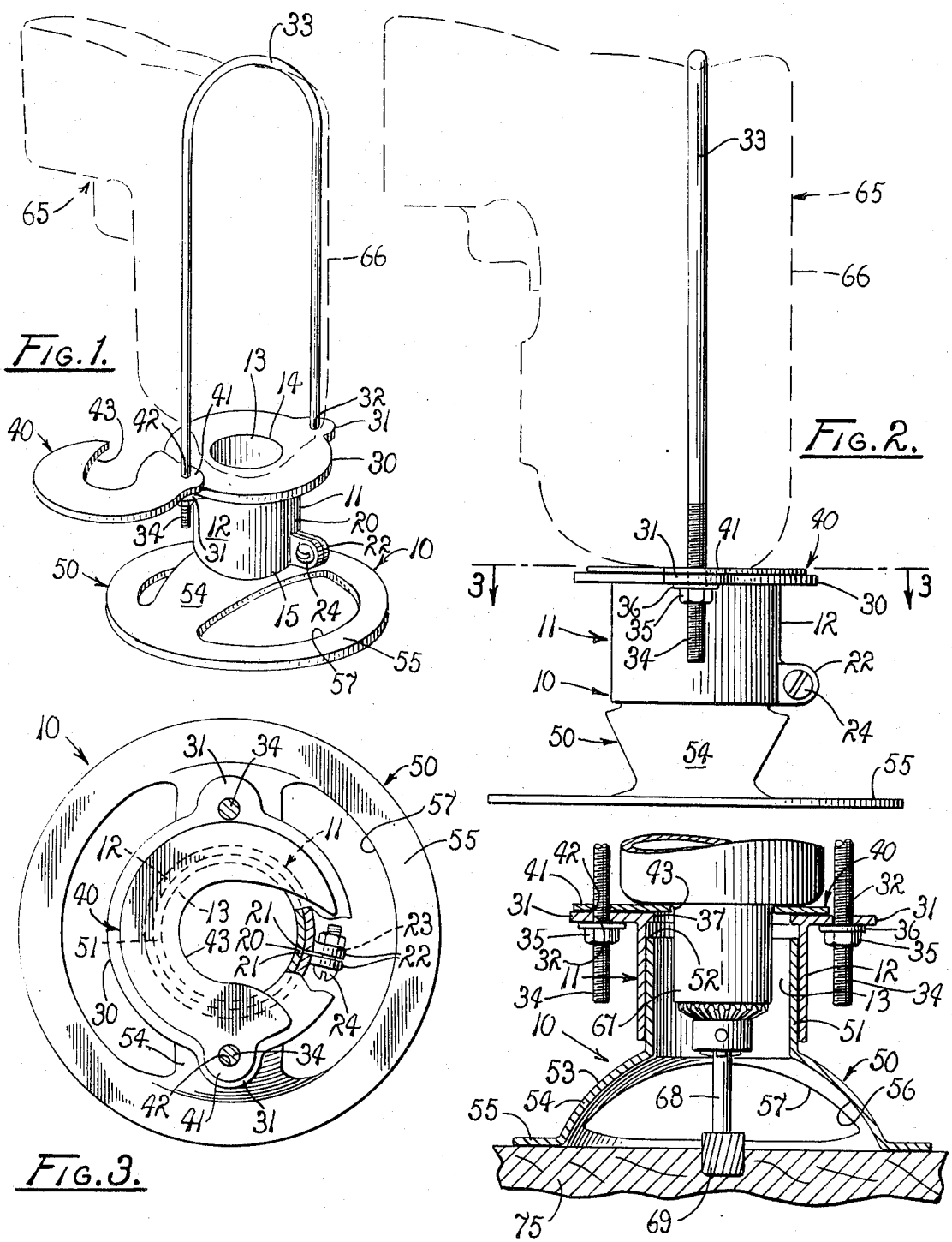

ATTACHMENT FOR A HAND TOOL

BACKGROUND OF THE INVENTION

The present invention relates to attachments for hand tools and more particularly to such an attachment which allows an electric drill to be converted for use as a router.

There has been a problem in the use of hand tools, both commercially and privately, in that separate tools must be acquired to perform individual types of wood working or metal working operations. In the past, few hand tools have been convertible to permit the performance of a variety of tasks. Commonly, those few tools that have been convertible have been expensive to purchase and frequently unreliable in operation because of the makeshift character of their construction.

In the majority of instances, then, a great variety of hand tools performing only one operation each have been required to be maintained on hand in order to provide the capability of performing diverse operations. The waste involved in such a practice is particularly apparent with power tools. Power tools such as electric drills, routers and sanders are essentially equivalent in structure and operation. Each has an electric motor adapted to rotate a chuck at high speed which is adapted to receive a bit having a drill, router blade, or sanding pad at the operative end thereof. Because of this similarity, many drills come equipped with bits fitted with sanding pads to allow such use. However, since a router requires precisely controlled positioning of the routing blade with respect to the workpiece, no such simple conversion of a drill for use as a router has previously been possible.

It has been recognized therefore that it would be desirable to have an attachment which can be employed inexpensively and conveniently to convert any conventional electric drill or similar power tool for temporary use as a router.

SUMMARY OF THE INVENTION

An object of the present invention, therefore, is to provide an attachment for converting an electric drill or similar power tool for use as a router.

Another object is to provide such an attachment which is adaptable for converting any of a variety of types and sizes of electric drills into a router.

Another object is to provide such an attachment which is sufficiently durable so as to be capable of withstanding prolonged and abusive use.

Another object is to provide such an attachment which securely supports the electric drill for precise positioning, relative to a workpiece, of a router blade mounted in the drill.

Another object is to provide such an attachment which is adjustable to provide the desired depth of penetration of the router blade within the workpiece during use.

A further object is to provide such an attachment which allows visual observation of the router blade and workpiece so as to permit precise positioning thereof during use.

A still further object is to provide such an attachment which is light and durable in construction so as to facilitate movement thereof during use.

Other objects and advantages are to provide improved elements and arrangements thereof in a device for the purposes described which is dependable, economical, durable, and fully effective in accomplishing its intended purposes.

BRIEF DESCRIPTION OF THE DRAWING

FIG. 1 is a perspective view of the drill attachment of the present invention showing a drill in dashed lines retained therein.

FIG. 2 is a somewhat enlarged, side elevation of the drill attachment.

FIG. 3 is a horizontal section, taken on line 3—3 of FIG. 2, with a portion of a platform removed for illustrative convenience to show the detail therebelow.

FIG. 4 is a fragmentary, transverse vertical section of the drill attachment showing a router blade in position in a workpiece.

DESCRIPTION OF THE PREFERRED EMBODIMENT

Referring in greater detail to the drawing, in FIG. 1 the attachment of the present invention is generally indicated by the numeral 10. The attachment has a substantially cylindrical chuck housing 11 having a side wall 12 and an internal passage 13 of predetermined diameter. The housing has a chuck end 14 and a guide end 15.

The side wall 12 of the housing 11 has a gap 20 therein extending longitudinally of the side wall from the guide end 15 to a position adjacent to the chuck end 14. The gap is of a predetermined relatively small width at the guide end of the housing and is defined by opposite sides 21 of the side wall which converge toward the chuck end of the housing. A pair of ears 22 are coextensively provided on each of the opposite sides of the side wall at the guide end of the housing and extend laterally from the housing, as best shown in FIG. 3. The ears have aligned bore holes 23 extending therethrough in tangentially spaced relation to the housing. A nut and bolt assembly 24 is provided extending through the bore holes of the ears so as to permit closing of the gap through drawing the opposite sides 21 together by tightening of the nut and bolt assembly.

A platform 30 is coextensively provided at the chuck end 14 of the housing 11 and defines a plane normal to the axis of the passage 13. Mounting flanges 31 are provided on opposite sides of the platform in the plane thereof, as best shown in FIG. 3. A bore 32 is provided in each of the flanges defining an axis parallel to the axis of the passage. An arcuate retention yoke 33, having opposite threaded ends 34, is mounted on the platform with the threaded ends received through the bores of the flanges. A nut 35 and washer 36 are received on the opposite threaded ends 34 of the yoke and are adjustable to position the yoke relative to the platform. An annular lip 37 extends a short distance into the passage 13 at the chuck end of the housing in the plane of the platform.

An adapter shim 40 of predetermined thickness, having a flange 41 with a bore 42 therethrough, is rotationally received on the yoke 33 with one of the threaded ends 34 thereof extending through the bore of the flange. During use, the shim is gravitationally received in resting relation on the platform 30, as best shown in FIG. 3. The shim has a substantially U-shaped opening 43 extending into the center of the shim of dimensions smaller than the diameter of the passage 13 of the housing 11.

A base 50, having a cylindrical sleeve 51 at one end thereof of a diameter conforming to the internal diameter of the passage 13 of the housing 11, is received in the housing with the sleeve slidably positionable in the passage in telescopic relation thereto. The sleeve has a stop end 52 which extends farthest into the passage. The base further provides a guide 53 coextensive with the sleeve and positioned axially thereof opposite the stop end of the sleeve. The guide consists of opposite arcuate arms 54 having a contact ring 55 at the remote ends thereof defining a plane normal to the axis of the sleeve. The guide has an interior 56. The arms 54 and the contact ring 55 define opposite openings 57. The housing 11 and base 50 can be constructed of any suitable material but are suitably constructed of a durable plastic material.

As shown in dashed lines in FIGS. 1 and 2, the yoke 33 is adapted to receive a conventional electric drill 65 or similar hand tool having a drill housing 66 and a work end or drill chuck 67. As shown in FIG. 4, the drill chuck is adapted to receive a conventional bit 68 having a router blade 69 at the operative end thereof for use on a workpiece 75.

OPERATION

The operation of the described embodiment of the subject invention is believed to be clearly apparent and is briefly summarized at this point. To utilize the attachment 10 to convert a conventional electric drill 65 or similar hand tool for use as a router, the bit 68 having a router blade 69 at the operative end thereof is received in the drill chuck 67 and clamped therein in the conventional manner. The nuts 35 are then adjusted on the opposite threaded ends 34 of the yoke 33 to loosen the yoke with respect to the platform 30. The housing 66 of the electric drill is then positioned through the yoke with the drill chuck and bit extending through the passage 13 of the housing 11, as best shown in FIGS. 2 and 4. The nuts 35 are then tightened down to secure the yoke about the housing 66 of the drill so as securely to retain the drill chuck within the passage. In order to accommodate electric drills having housings of a smaller than standard size, the shim 40 may be positioned, as shown in FIG. 3, so that the housing 66 of the drill will be rested against the shim with the drill chuck received through the U-shaped opening 43 of the shim.

In order to control the depth of penetration of the router blade 69, the guide 53 is adjusted relative to the router blade. This is accomplished by loosening the nut and bolt assembly 24 to allow the gap 20 in side wall 12 to open. The sleeve 51 is then slidably positioned within the passage 13 of the housing 11 so that the router blade extends beyond the contact ring 55 of the guide to the desired extent, such as shown in FIG. 4. The nut and bolt assembly is then tightened to close the gap to clamp the side wall 12 of the housing about the sleeve so as securely to retain the sleeve in the position desired. It will be noted that movement of the sleeve within the passage is limited in one direction by the stop end 52 of the sleeve coming into contact with the annular lip 37.

With the attachment 10 mounted on the electric drill 65, as described, the drill is simply positioned in the conventional manner with respect to the workpiece 75. In order to initiate operation, a starting hole can be drilled in the workpiece to permit initial entry of the router blade into the workpiece and so as to bring the contact ring 55 into contact with the workpiece, as shown in FIG. 4. The drill is then actuated and operated in the conventional manner to perform the routing operation. By sliding the ring 55 about on the workpiece to traverse any desired path, the router cuts the workpiece to the desired depth.

It will be seen that the openings 57 of the guide 53 allow visual observation of the workpiece 75 and the router blade 69 to allow precise positioning of the blade for performance of the routing operation. The openings also perform the function of allowing residue produced by the routing operation to escape from the interior 56 of the guide so as to permit continuous use and to facilitate visual observation of the router blade. It will be noted that the adjustable positioning of the sleeve 51 within the passage 13 of the housing 11 permits a variety of depths of penetration of the router blade within the workpiece selectively to be chosen by the operator. The diameter of the contact ring permits a variety of sizes of router blades to be employed thereby insuring flexibility of use of the attachment 10.

The adjustability of the attachment 10 makes possible use of the device on a variety of sizes and shapes of drills. The construction of major portions of the drill attachment out of a durable plastic material makes the attachment light and easy to position so as to facilitate the routing operation. Furthermore, the very simplicity of construction of the attachment makes possible a device which is inexpensive to produce and thereby permits a substantial savings in relation to conventional routers which are not capable of convertible use.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In combination with a powered drill, having a drill chuck adjustable to receive a bit mounting a router blade for use on a workpiece, an attachment comprising a guide having a workpiece contact ring with arms convergently extending from spaced points on the ring; a cylindrical sleeve interconnecting the arms in substantial axial alignment with the ring; a chuck receiving housing having opposite ends and a substantially cylindrical side wall, said side wall being severed to define a gap extending longitudinally of the housing from one end thereof; a drill platform borne by the housing on the opposite end thereof defining a plane substantially normal to an axis defined by the side wall; a return bent yoke mounted on the platform for drill securing adjustment to and from the platform; and means for closing the gap by drawing the side wall together in binding relation about the cylindrical sleeve to secure the guide on the housing with the ring selectively positioned relative to the router blade.

2. The attachment of claim 1 in which the means includes a pair of ears integrally extending from the side wall on opposite sides of the gap, said ears being adjustably interconnected by a nut and bolt assembly.

3. The attachment of claim 2 in which a small drill chuck adapter shim is pivotally mounted on the yoke, said shim having a substantially U-shaped opening therein which is registrable with the interior of the housing.

\* \* \* \* \*